UNITED STATES PATENT OFFICE.

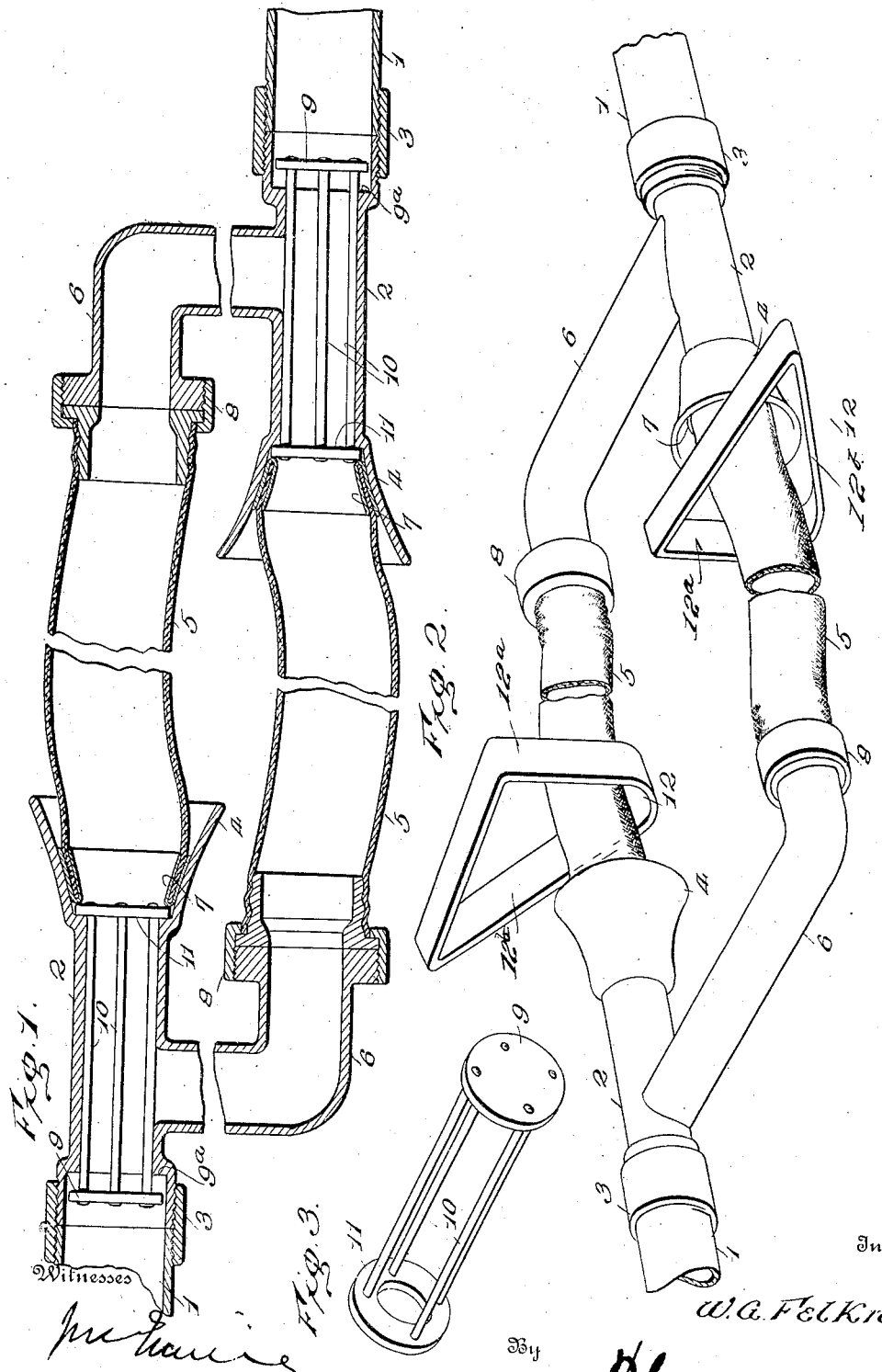

WILLIAM G. FELKNER, OF SEBREE, TEXAS.

TRAIN-PIPE COUPLING.

No. 895,735.   Specification of Letters Patent.   Patented Aug. 11, 1908.

Application filed November 22, 1907. Serial No. 403,351.

*To all whom it may concern:*

Be it known that I, WILLIAM G. FELKNER, a citizen of the United States, residing at Sebree, in the county of Jack and State of Texas, have invented certain new and useful Improvements in Train-Pipe Couplings, of which the following is a specification.

This invention contemplates certain new and useful improvements in that type of hose couplings embodying automatically acting valves that are arranged to close so as to shut off the flow or passage of the air, water, or other fluid, and relates particularly in its present adaptation to an automatic hose coupling of this character for the train pipes or other pipes of air brake systems of railway cars designed to instantly and automatically close the train pipe whenever one car is detached from a train or a break made between any two cars, although the invention is of course applicable to the coupling together of pipes generally.

The invention has for its object a simple, durable and efficient construction of apparatus of this character which may be cheaply made and installed and which is composed of comparatively few and simple parts that will not be liable to get out of order and that will readily and automatically connect together when the cars are coupled, and the invention consists in certain constructions, arrangements and combinations of the parts that I shall hereinafter fully describe and claim.

For a full understanding of the invention, reference is to be had to the following description and accompanying drawings, in which:

Figure 1 is a longitudinal sectional view of a train pipe joint effected by the use of my improved hose couplings, the flexible hose members being shown broken out in order to economize space; Fig. 2 is a perspective view of the joint; and, Fig. 3 is a detail perspective view on a somewhat enlarged scale of the valve employed.

Corresponding and like parts are referred to in the following description and indicated in all the views of the drawings by the same reference characters.

Referring to the drawings, the numeral 1 designates the two train pipes of an air brake system at the adjoining ends of two cars, and 2 designates the valve casings of my improved hose coupling, there being one of these employed for each end of a train pipe, that is, one at each end of a car. Each valve casing 2 may be connected at one end in a detachable manner to the train pipe, as by the union or other coupling 3, or by any other desired means, and the other end of the valve casing has formed integrally therewith, or secured thereto, in any desired way, a flared socket portion 4. One end of a flexible hose pipe connecting member 5 is designed to be wedged in the socket portion 4 so as to be held by frictional engagement. Each valve casing 2 is formed with a laterally and preferably angular branch 6 to which one end of the complemental hose pipe coupling member 5 is connected, it being understood, as clearly illustrated in the drawing, that the flared socket end 4 of one valve casing faces the end of the branch 6 of the complemental valve casing on the adjoining car. Preferably one end of each hose pipe coupling member 5 is formed with a metallic tip 7 to wedge securely in the socket 4, and the opposite end of each hose pipe coupling member 5 may be detachably secured to the branch 6 of the valve casing by means of the swivel coupling 8 or other desired fastening. Each valve casing 2 contains a valve which, in the present instance, as best seen in Fig. 3, comprises a disk-like head 9, a plurality of spaced rods 10 secured at one end thereto, and an annular or ring-like abutment member 11 secured to the other end of said rod. The valve is mounted to move longitudinally in the valve casing, as shown, and the rods extend entirely therethrough, the abutment member 11 being mounted in the tapered socket 4. The entire valve is longer than the distance between the base of the socket 4 and the valve seat $9^a$.

From the foregoing description in connection with the accompanying drawing, it will be seen that in the practical application of my improved automatic hose coupling mechanism, when the detached end of a hose pipe coupling member 5 is pressed inwardly into a socket 4, it will engage the abutment member 11 and move the valve 9 to an open position and maintain it in such position so long as the parts are coupled together. Whenever any break occurs, it is obvious that the tip end 7 of either one or both of the hose pipe coupling members 5 will be withdrawn from its corresponding socket and the air pressure will instantly cause the valve 9 to seat, to cut off the flow of train pipe air. It is to be understood that one end of each flexible coupling member 5 is permanently, although detachably secured to the other end of the branch 6, while the other or tip end 7 is only secured in place in the socket 4 when the cars are coupled together or other pipes are to be coupled. It is also to be understood that the coupling devices are arranged partially underneath the drawheads of cars at a given distance from the top of the rails when the apparatus is used in connection with air brake systems, and that the members 5 are of sufficient length to permit of the cars rounding the curves and other lateral play of the parts without rendering the apparatus liable to accidental detachment.

It is to be understood that the connecting members 5 are sufficiently stiff to maintain themselves straight until they are forced to flex by the endwise compression produced from the coming together of the two valve casings upon the coupling of cars. This is indicated in Figs. 1 and 2 of the drawings.

In order to support the connecting members 5 in such position that their tip ends 7 will automatically enter and wedge into the flared sockets 4, I provide framelike and preferably angular supporting members 12 that are secured in line with the extremities of the branches 6 by means of rods (not shown) or any other desired devices attached to any desired portion of the car framework. Each of these members 12 embodies an inner vertical side 12ª and an outwardly and laterally inclined portion 12ᵇ, as best seen in Fig. 2, on which the connecting members ride when they are flexed, and down which they may slide so as to again come to a coupling position when the cars are uncoupled.

Having thus described the invention, what is claimed as new is:

1. The combination with pipes to be coupled together, of valve casings connected to the respective pipes, valves mounted in the casings and adapted to automatically close, pliable connecting members arranged to connect the valve casings together and adapted to hold the valves open, said connecting members being arranged to be held in flexed condition and to be sufficiently stiff to resume and maintain a straight position upon the uncoupling of the two casings, and supporting members extending around the respective connecting members and arranged to permit the outward flexing thereof, substantially as shown and described.

2. The combination with pipes to be coupled together, of valve casings connected to the respective pipes, valves mounted in the casings and adapted to automatically close, pliable connecting members arranged to connect the valve casings together and adapted to hold the valves open, and supporting members for the respective connecting members, each of the supporting members embodying an outwardly and lateral inclined portion on which the connecting members is designed to travel when outwardly flexed.

3. The combination with pipes to be coupled together, of valve casings connected to the respective pipes, valves mounted in the casings and adapted to automatically close, pliable connecting members arranged to connect the valve casings together and adapted to hold the valves open, and angular supporting members for the respective connecting members, said supporting members each embodying a vertical inner portion and a laterally and outwardly inclined portion, substantially as shown and described.

In testimony whereof I affix my signature in presence of two witnesses.

WILLIAM G. FELKNER. [L. S.]

Witnesses:
   J. T. HOPPER,
   A. J. MYERS.